United States Patent
Oh et al.

(10) Patent No.: US 11,428,970 B2
(45) Date of Patent: Aug. 30, 2022

(54) DISPLAY DEVICE HAVING A UNI-BODY INTEGRATED HOUSING

(71) Applicant: Dell Products L.P., Round Rock, TX (US)

(72) Inventors: Guentaek Oh, Singapore (SG); Daehyun Kim, Singapore (SG)

(73) Assignee: Dell Products L.P., Round Rock, TX (US)

( * ) Notice: Subject to any disclaimer, the term of this patent is extended or adjusted under 35 U.S.C. 154(b) by 5 days.

(21) Appl. No.: 16/887,088

(22) Filed: May 29, 2020

(65) Prior Publication Data

US 2021/0373380 A1    Dec. 2, 2021

(51) Int. Cl.
*G02F 1/1333* (2006.01)
*F21V 8/00* (2006.01)

(52) U.S. Cl.
CPC ..... *G02F 1/133308* (2013.01); *G02B 6/0088* (2013.01); *G02F 1/133314* (2021.01)

(58) Field of Classification Search
None
See application file for complete search history.

(56) References Cited

U.S. PATENT DOCUMENTS

| | | | | |
|---|---|---|---|---|
| 2013/0342970 A1* | 12/2013 | Franklin | ............... | G06F 1/1656 361/679.01 |
| 2014/0055976 A1* | 2/2014 | Gu | ............... | H04N 5/00 361/809 |
| 2014/0125877 A1* | 5/2014 | Nakamura | ............... | H04N 5/655 362/97.1 |
| 2015/0338571 A1* | 11/2015 | Jun | ............... | G02B 6/0088 362/97.1 |
| 2017/0292691 A1* | 10/2017 | Coo | ............... | G02F 1/133308 |
| 2017/0315400 A1* | 11/2017 | Ahn | ............... | G02B 6/0085 |

\* cited by examiner

*Primary Examiner* — Phu Vu
(74) *Attorney, Agent, or Firm* — Terrile, Cannatti & Chambers; Stephen A. Terrile

(57) ABSTRACT

A display device includes: an open cell liquid crystal display (LCD) component an optical sheets component; a light guide plate; a scalar board; and, a uni-body rear cover, the uni-body rear cover affixing the optical sheets component to the display device, maintaining a gap between the open cell component and the optical sheets component, providing an exterior of the display device, protecting the open cell component from external forces and protecting the scalar board of the display device.

10 Claims, 8 Drawing Sheets

DISPLAY DEVICE HAVING A UNI-BODY INTEGRATED HOUSING

BACKGROUND OF THE INVENTION

Field of the Invention

The present invention relates to information handling systems. More specifically, embodiments of the invention relate to information handling system display devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to couple an information handling system with a display device. FIG. 1, labeled Prior Art, shows a partial cross section of a known display device. The known display device includes an open cell liquid crystal display (LCD) component 110, a plurality of optical sheets 112, a light guide plate 114, a gasket 116, a guide panel 118, a bent metal support panel 120, a middle frame 122 and a rear cover 124. The guide panel (also referred to as a backlight unit) affixes the optical sheet, maintains a gap between the optical sheet and the open cell, maintains a gap between the open cell and the middle frame and is assembled with the rear cover. The middle frame (also referred to as a set component), provides a portion of the exterior of the display device, protects the open cell from external forces, is assembled with the middle frame and is assembled with the rear cover. The rear cover provides a portion of the exterior of the display device, protects a scalar board and cabling (not shown) of the display device and is assembled with the middle frame. The display device also includes an attachment mechanism 126, such as a screw, for attaching the middle frame and the bent metal support panel.

SUMMARY OF THE INVENTION

An information handling system display device which includes a uni-body integrated housing is disclosed.

More specifically, in one embodiment the invention relates to a display device comprising: an open cell liquid crystal display (LCD) component; an optical sheets component; a light guide plate; a scalar board; and, a uni-body rear cover, the uni-body rear cover affixing the optical sheets component to the display device, maintaining a gap between the open cell component and the optical sheets component, providing an exterior of the display device, protecting the open cell component from external forces and protecting the scalar board of the display device.

In another embodiment the invention relates to a system comprising: a processor; a data bus coupled to the processor; and a display device, the display device comprising an open cell liquid crystal display (LCD) component; an optical sheets component; a light guide plate; a scalar board; and, a uni-body rear cover, the uni-body rear cover affixing the optical sheets component to the display device, maintaining a gap between the open cell component and the optical sheets component, providing an exterior of the display device, protecting the open cell component from external forces and protecting the scalar board of the display device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
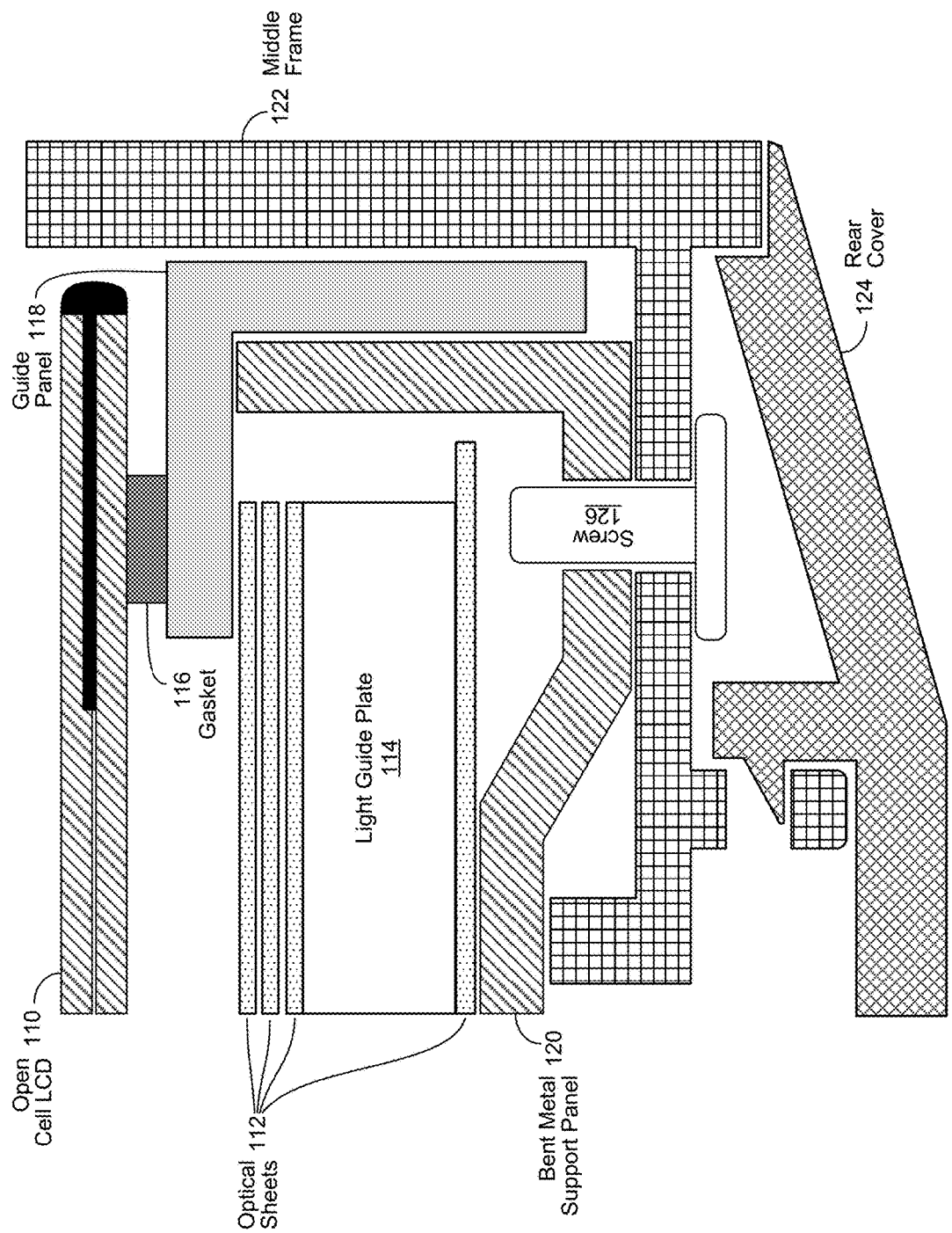
FIG. 1, labeled Prior Art, shows a partial cross section of a known display device.
Figure 2:
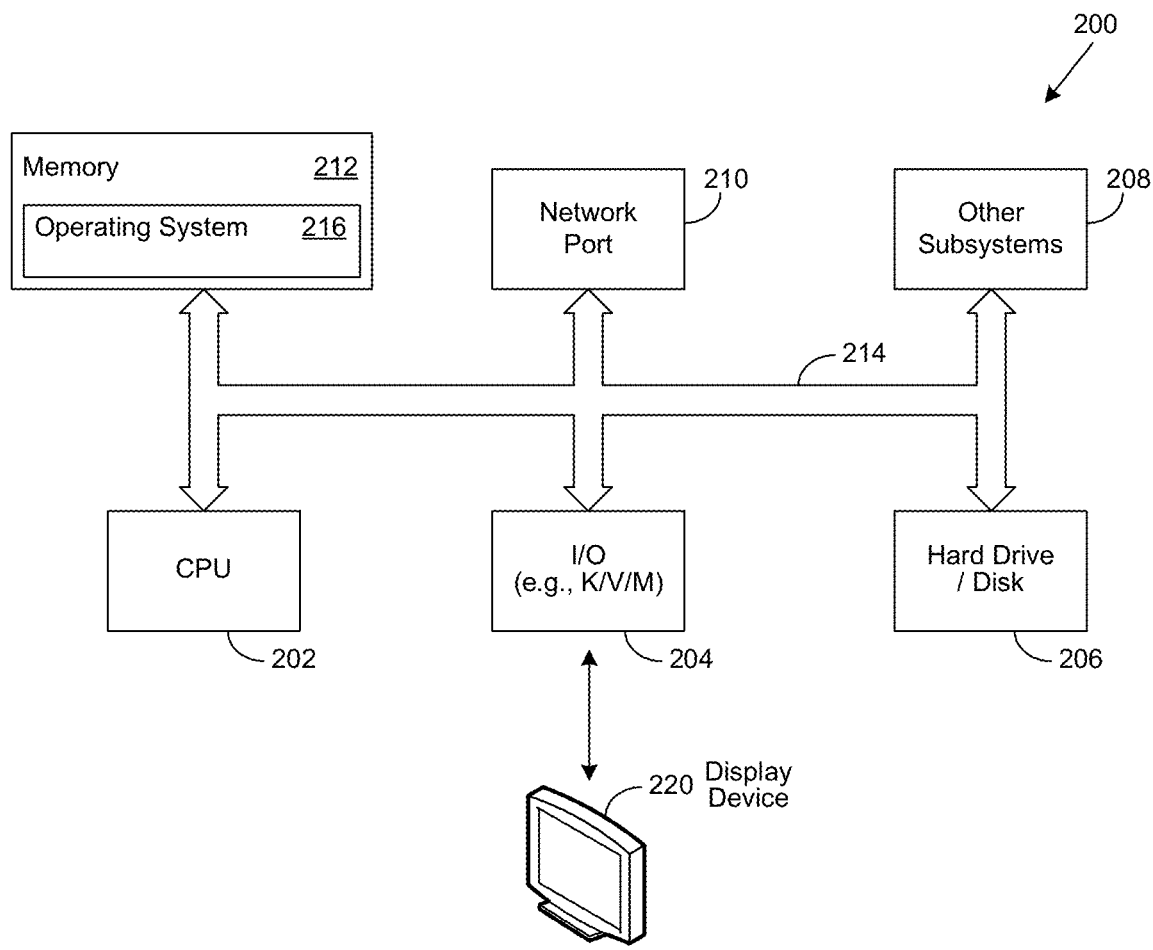
FIG. 2 shows a general illustration of components of an information handling system as implemented in the present invention.

FIG. 2 is a generalized illustration of an information handling system 200 that can be used to implement the system and method of the present invention. The information handling system 200 includes a processor (e.g., central processor unit or "CPU") 202, input/output (I/O) devices 204, such as a display, a keyboard, a mouse, a touchpad or touchscreen, and associated controllers, a hard drive or disk storage 206, and various other subsystems 208. In various embodiments, the information handling system 200 also includes network port 210 operable to connect to a network 240, which is likewise accessible by a service provider server 242. The information handling system 200 likewise includes system memory 212, which is interconnected to the foregoing via one or more buses 214. System memory 212 further comprises operating system (OS) 216. In various embodiments, the information handling system 200 is coupled with and communicates with a display device 220. In various embodiments, the information handling system is integrated with the display device to provide an all in one (AIO) type information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
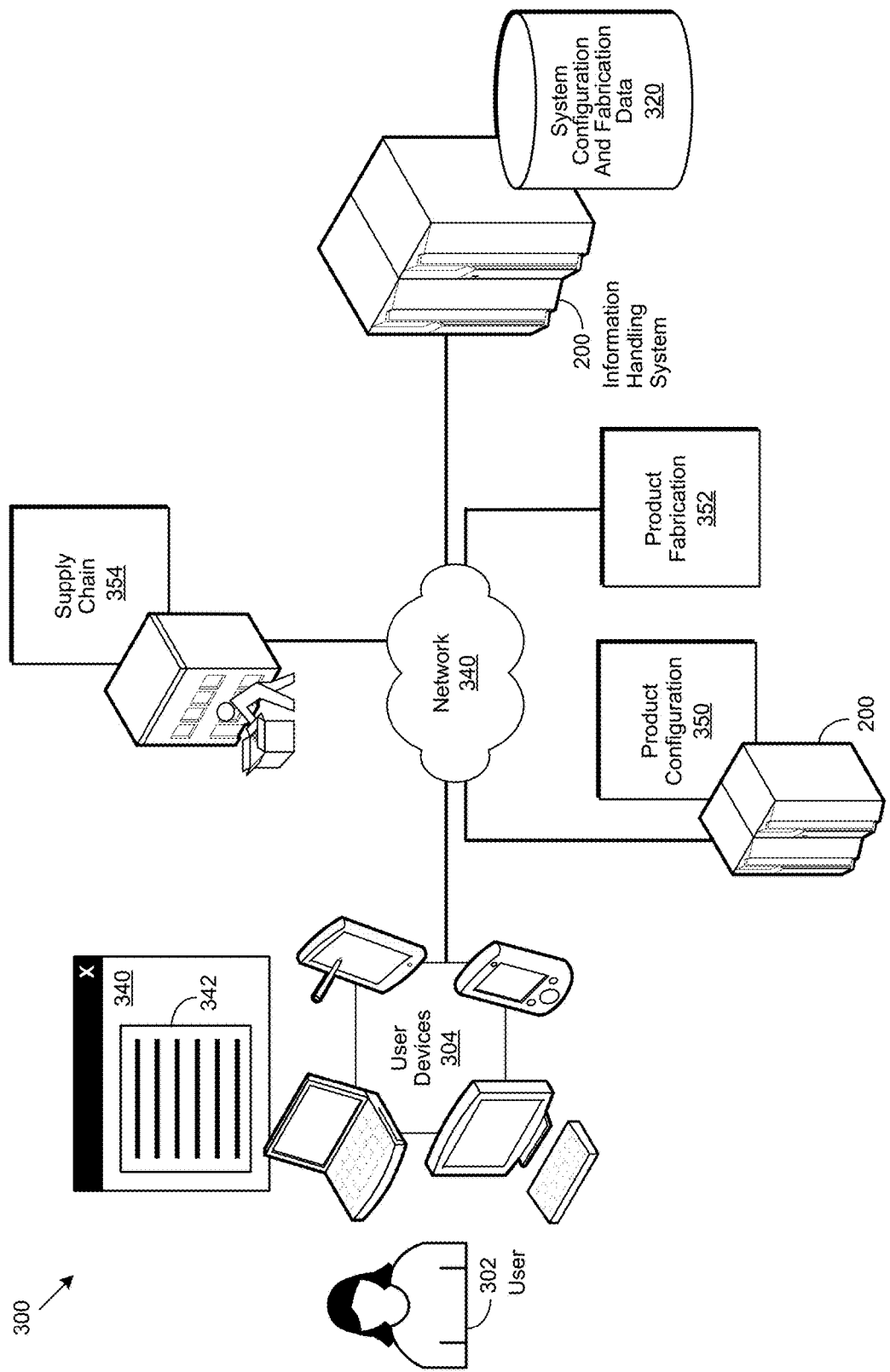
FIG. 3 shows a block diagram of an information handling system configuration and fabrication environment.

FIG. 3 is a block diagram of an information handling system configuration and fabrication environment 300 implemented in accordance with an embodiment of the invention. In certain embodiments, the information handling system configuration and fabrication environment 300 may include a repository of information handling system configuration and fabrication data 320. In certain embodiments, the repository of information handling system configuration and fabrication data 320 may be local or may be executed remotely.

In certain embodiments, the user device 304 is used to exchange information between the user 302 and a product configuration system 350, and a custom product fabrication system 350, through the use of a network 340. In certain embodiments, the network 340 may be a public network, such as a public internet protocol (IP) network, a physical private network, a wireless network, a virtual private network (VPN), or any combination thereof. Skilled practitioners of the art will recognize that many such embodiments are possible and the foregoing is not intended to limit the spirit, scope or intent of the invention. As used herein, a user device 304 refers to an information handling system such as a personal computer, a laptop computer, a tablet computer, a personal digital assistant (PDA), a smart phone, a mobile telephone, or other device that is capable of communicating and processing data. In certain embodiments, the user device 304 may be configured to present a configuration and/or fabrication system user interface (UI) 340. In certain embodiments, the configuration and/or fabrication system UI 340 may be implemented to present a graphical representation 342 of configuration and/or fabrication information.

In various embodiments, the configuration and/or fabrication system UI 340 may be presented via a website. In certain embodiments, the website may be provided by the product configuration system 350. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input to a web server.

In certain embodiments, the user device 304 may be implemented to interact with the product configuration system 350, which in turn may be executing on a separate information handling system 200. In various embodiments, the product configuration system 350 interacts with a custom product fabrication system 352. In various embodiments, the custom product fabrication system 352 fabricates products.

In various embodiments, the display device 220 includes a uni-body housing which increases the efficiency of the supply chain 354 when supplying the various components to the product fabrication system 352.

Figure 4:
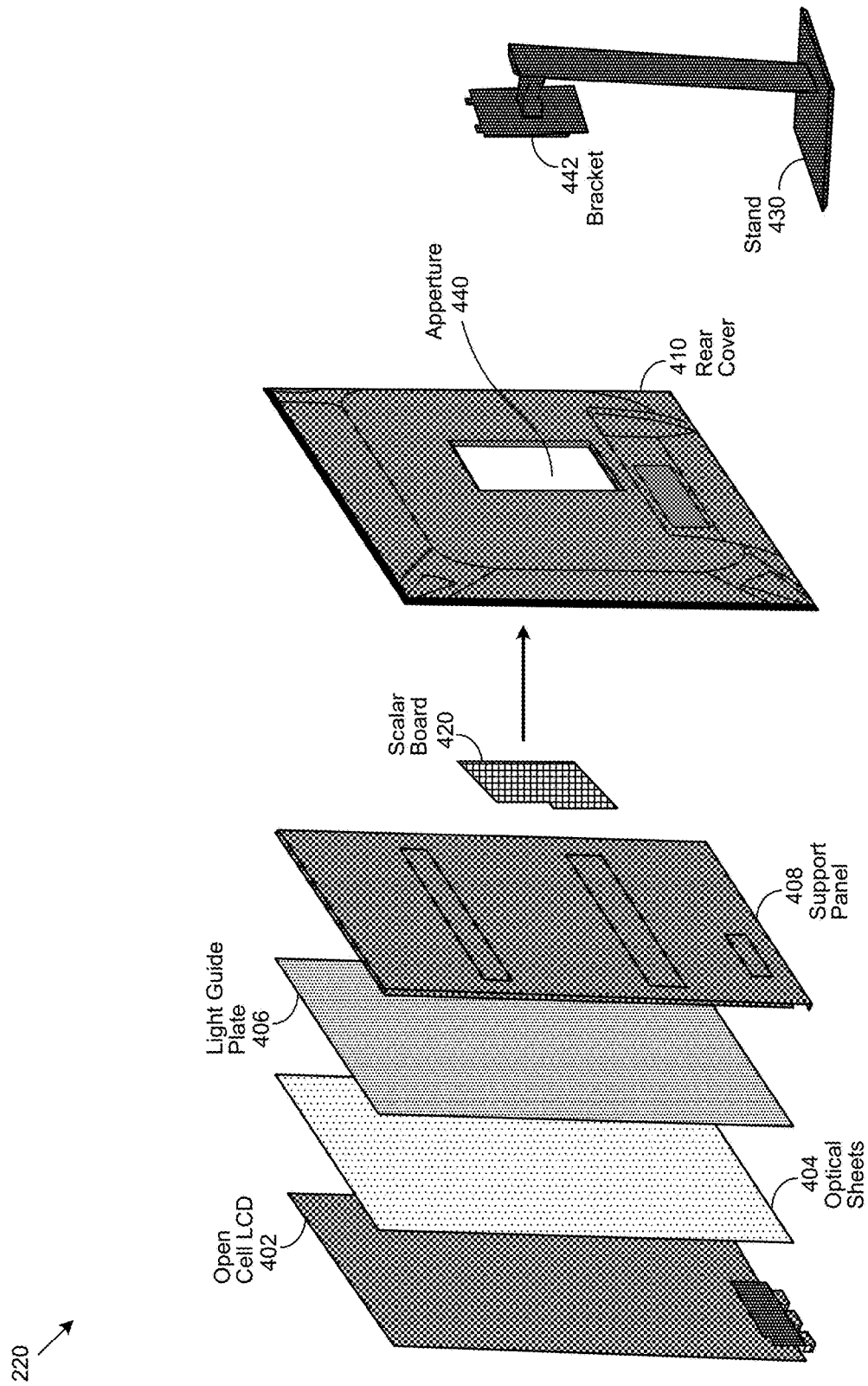
FIG. 4 shows a simplified exploded view of a display device in accordance with the present invention.

FIG. 4 shows a simplified exploded view of a display device 220 in accordance with the present invention. The display device includes an open-cell LCD component 402, an optical sheets component 404, a light guide panel 406, a support panel 408 and a rear cover 410. The display device 220 further includes a scalar board 420. In certain embodiments the display device 220 also includes a stand 430.

The rear cover 410 defines an aperture 440 via which the scalar board 420 may be accessed without the need to remove the rear cover. In certain embodiments, the aperture 440 is rectangular. In certain embodiments the aperture 440 mates with a bracket 442 of the stand 430 to allow the stand to be attached to the rear cover 410. In certain embodiments, the aperture 440 has a width and height that are slightly larger (e.g., less than 20% larger) than the width and height of the scalar board 420.

Figure 5:
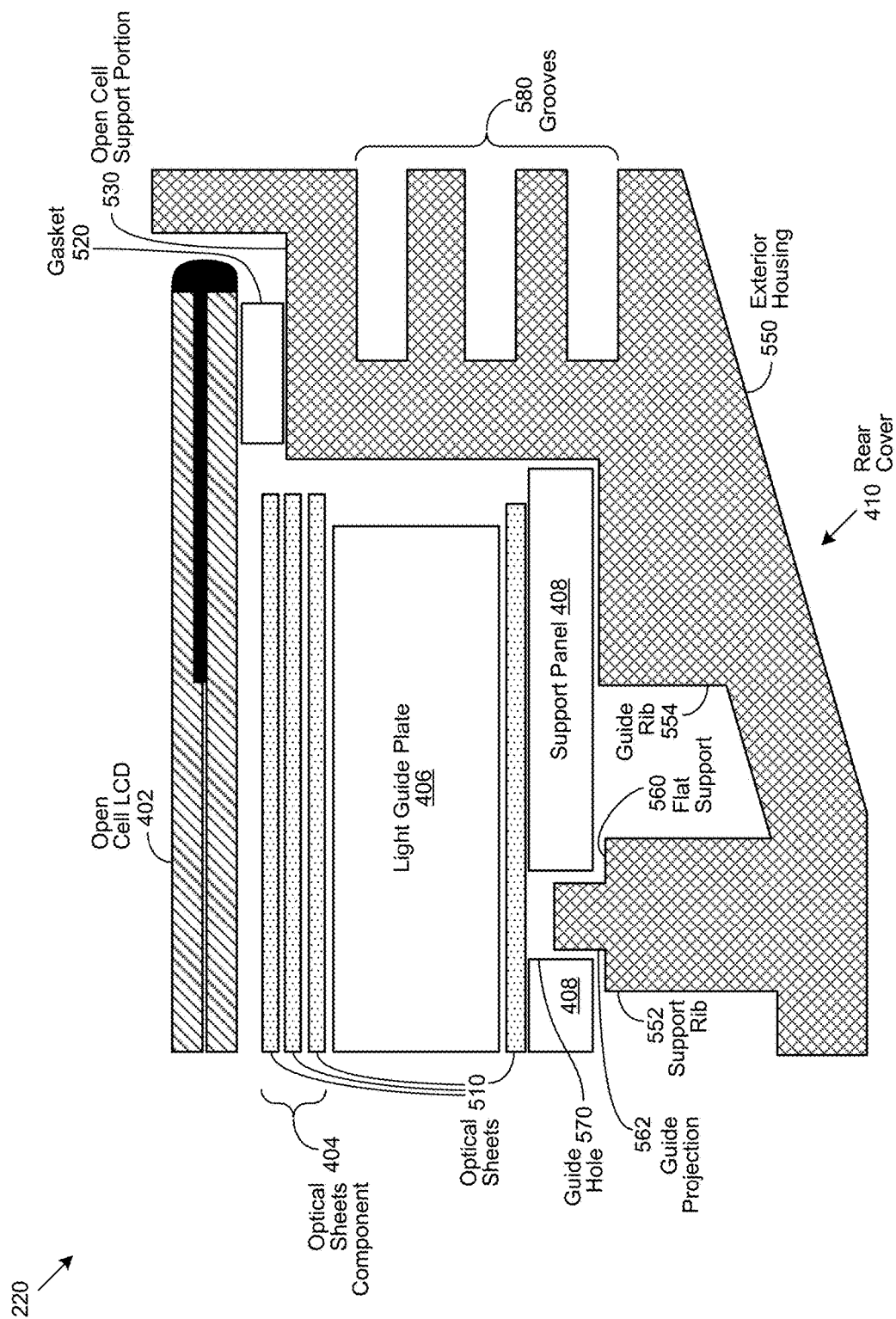
FIG. 5 shows a partial cross section of a display device in accordance with the present invention.

FIG. 5 shows a partial cross section of a display device 220 in accordance with the present invention. The display device 220 includes the open cell liquid crystal display (LCD) component 402, the optical sheets component 404, the light guide panel 406, the support panel 408 and the rear cover 410. In certain embodiments the optical sheets component 404 includes a plurality of optical sheets 510. In certain embodiments the display device includes a pad 520. In certain embodiments, the rear cover 410 defines an open cell support portion 530, which provides structure support for the open cell LCD component. In certain embodiments, the pad 520 is constructed of a foam material. In certain embodiments, the foam pad comprises a polyurethane as well as an adhesive. In certain embodiments, the pad 520 affixes the open cell LCD component 402 to the open cell support portion 530 via the adhesive.

The rear cover 410 affixes the optical sheets component 404 to the display device 220, maintains a gap between the open cell component 402 and the optical sheets component 404, provides the exterior of the display device 220, protects the open cell component 402 from external forces, and protects the scalar board 420 and cabling (not shown) of the display device 220. Accordingly, the rear cover performs the functions of the guide panel, the middle frame and the rear cover of the known display device. The rear cover 424 and the support panel 420 perform the same functions as the bent metal support panel of the known display device. The rear cover 410 and the support panel 408 enable provision of a slimmer and narrower display device when compared with the known display device. For example, in certain embodiments, the display device 220 has a depth of less than 7 mm (as compared to a depth of greater than 22 mm for the known display device). Also for example in certain embodiments, the display device 220 has a width of less than or equal to 0.2 mm between the rear cover 410 and the open cell component 404 (as compared to a width of greater than or equal to 0.07 mm between the open cell component and the middle frame of the known display device).

The rear cover 410 includes a rear cover exterior housing portion 550, a support and guide rib portion 552 and a support rib portion 554. In certain embodiments the support and guide rib portion 552 includes a flat support portion 560 and a guide projection 562. In certain embodiments, the support and guide rib portion 552 is integrated with the rear cover exterior housing portion 550. In certain embodiments, the support rib portion 554 is integrated with the rear cover housing portion 550. For the purposes of this disclosure, integrated shall mean fabricated from a single piece of material. In certain embodiments, the rear cover 410 is fabricated from a single piece of plastic.

The support panel 408 includes a guide hole 570. In certain embodiments, the support panel 408 is fabricated from a single sheet of metal. In certain embodiments the guide projection 5620 mates with the guide hole 570. In certain embodiments, the support panel is a fabricated from a flat sheet of metal.

In certain embodiments, the rear cover 410 also defines a plurality of grooves 580 extending along outside edges of the rear cover 410. In certain embodiments, the plurality of grooves 580 prevent shrinkage of the rear cover 410. The grooves are used to prevent shrinkage of the rear cover 410 as the uni-body rear cover is thicker when compared with known rear cover which has a separate middle frame.

Figure 6:
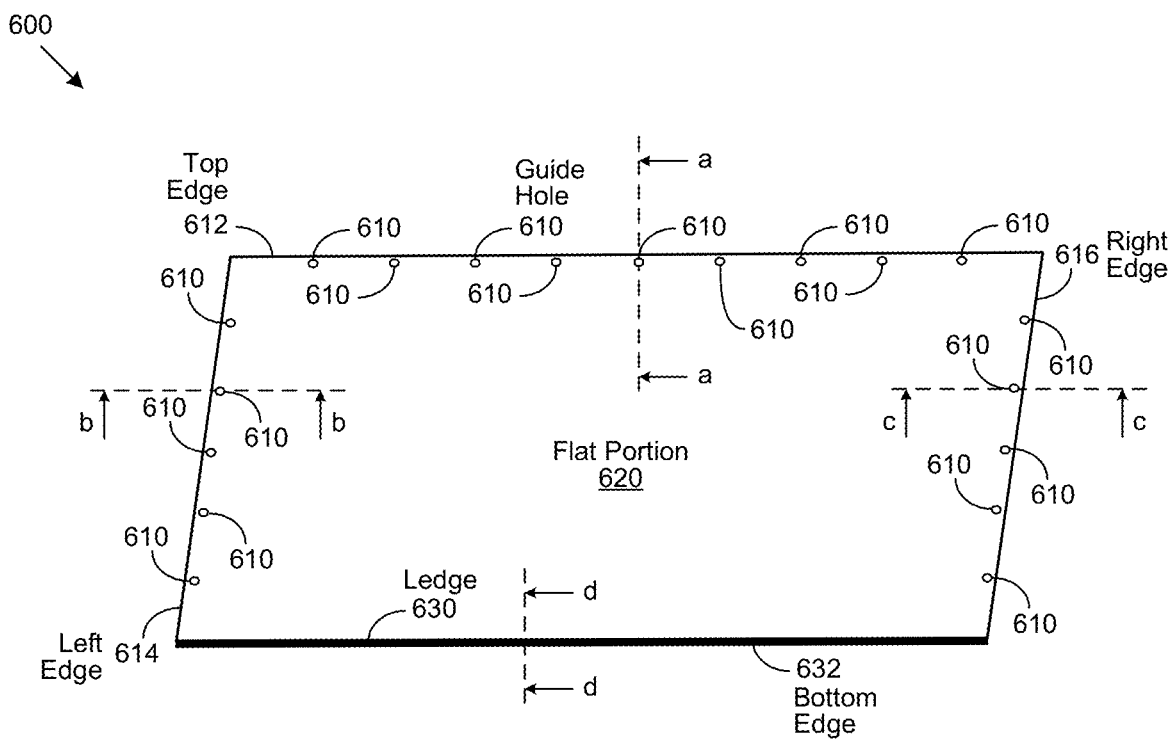
FIG. 6 shows a perspective view of an open cell support panel in accordance with the present invention.

FIG. 6 shows a perspective view of the support panel 600 in accordance with the present invention. In certain embodiments, the support panel 600 corresponds to the support panel 408. The support panel 600 defines a plurality of guide holes 610 which extend substantially along the periphery of the top edge 612, left edge 614 and right edge 616 of a flat portion 620 of the support panel 600. For the purposes of this disclosure substantially along the periphery may be defined as within 2 cm of the respective edge of the support panel. In certain embodiments, the support panel 408 comprises a ledge 630 which extends along the bottom edge 632. In certain embodiments, the support panel 600 and the ledge 630 are fabricated from a single flat sheet of metal.

Figure 7:
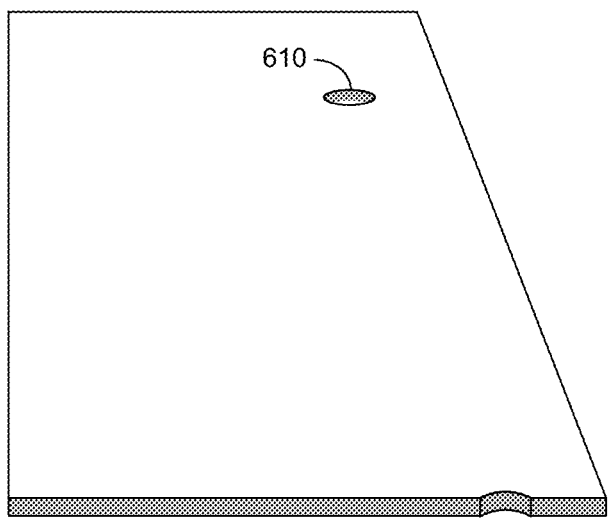
FIG. 7 shows a partial perspective view of a portion of the open cell support panel.

FIG. 7 shows a partial perspective view of a portion of the support panel 600 along the sections a-a, b-b and c-c. The support panel 600 defines the plurality of guide holes 610. In certain embodiments, the guide holes 610 are evenly spaced across each of the top edge 612, left edge 614 and right edge 616.

Figure 8:
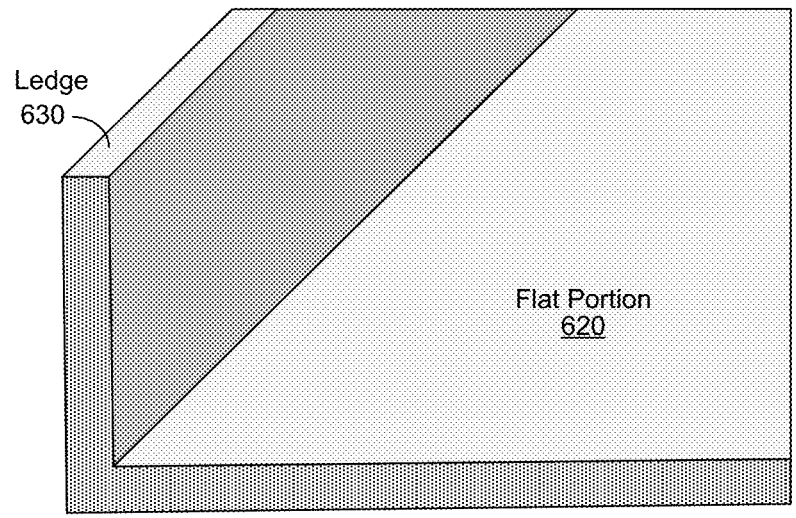
FIG. 8 shows a partial perspective view of another portion of the open cell support panel.

FIG. 8 shows a partial perspective view of another portion of the support panel 600 along section d-d. The support panel 600 comprises the ledge 630 extending across the bottom edge 632 of the support panel. In certain embodiments, the ledge 630 is integrated with the flat portion 620 of the support panel 600. In certain embodiments, the ledge 630 attaches the optical sheets component 404 and the light guide component 406 to the bottom portion of the display device 220.

Figure 9:
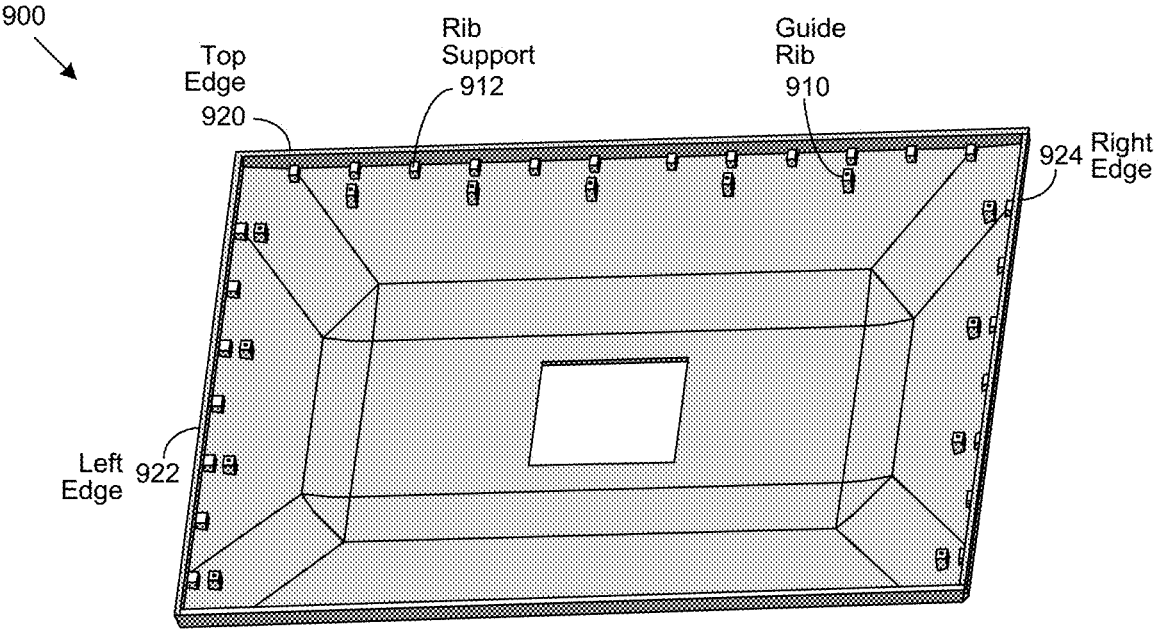
FIG. 9 shows a front perspective view of a uni-body integrated housing in accordance with the present invention.

FIG. 9 shows a front perspective view of a uni-body integrated housing 900 in accordance with the present invention. In certain embodiments, the uni-body integrated housing 900 corresponds to the rear cover 410. The uni-body integrated housing 900 includes a plurality of support and guide rib portions 910 and a plurality of support rib portion 912. The guide rib portions 910 extend substantially along an inside edge of the periphery of the top edge 920, left edge 922 and right edge 924 of the housing 900. The support and guide rib portions 910 extend substantially along an portion of the top edge 920, left edge 922 and right edge 924 of the housing 900 which is located further away from the periphery of the housing than the guide rib portions 910. For the purposes of this disclosure substantially along the periphery may be defined as within 2 cm (+/−10%) of the respective edge of the support panel. For the purposes of this disclosure, further away from the periphery may be defined as 5 cm (+/−10%) from the guide rib portion.

In certain embodiments, the support and guide rib portions 910 are integrated within the housing 900. In certain embodiments, the support rib portions 912 are integrated within the housing 900. In certain embodiments, the support and guide rib portions 910 are integrated with the rear cover exterior housing portion 550 of the housing 900. In certain embodiments, the support rib portions 912 are integrated with the rear cover exterior housing 550 of the housing 900.

Figure 10:
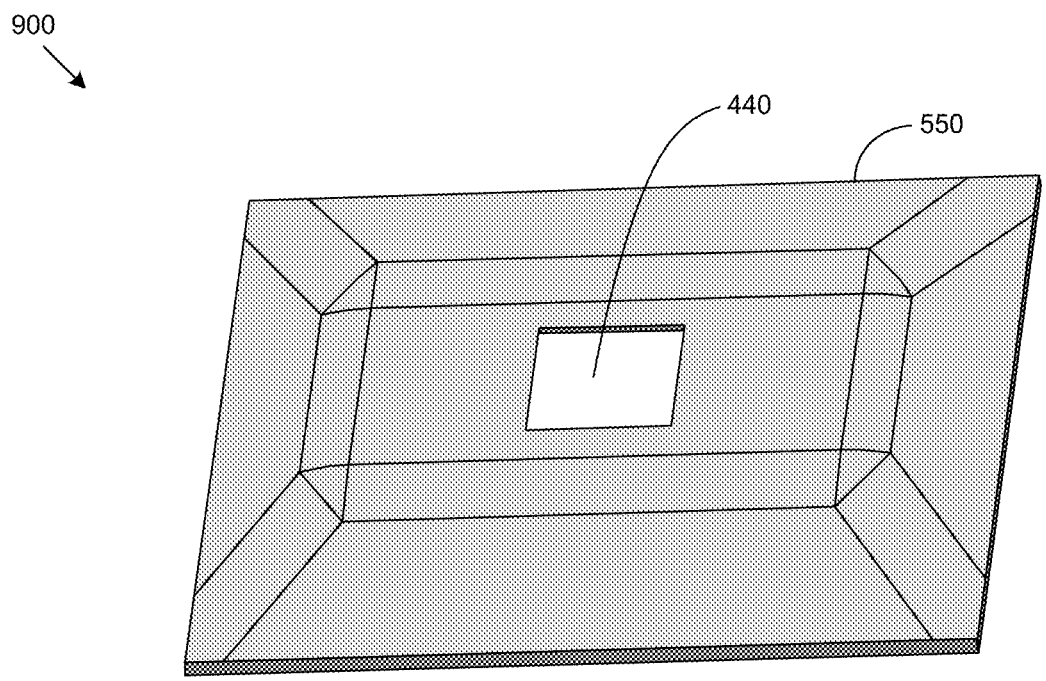
FIG. 10 shows a rear perspective view of the uni-body integrated housing.

FIG. 10 shows a rear perspective view of the uni-body integrated housing 900. The rear cover exterior housing 550 defines the aperture 440 via which the scalar board 420 may be accessed without the need to remove the rear cover. In certain embodiments, the aperture 440 is rectangular. In certain embodiments the aperture 440 mates with a bracket 442 of the stand 430 to allow the stand to be attached to the rear cover 410. In certain embodiments, the aperture 440 has a width and height that are slightly larger (e.g., less than 20% larger) than the width and height of the scalar board 420.

Figure 11:
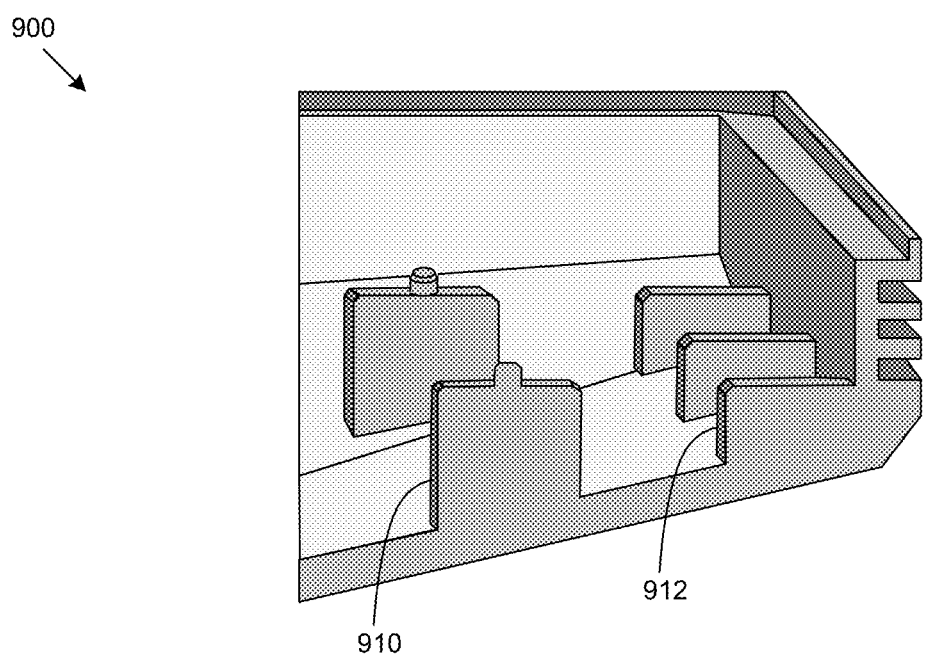
FIG. 11 shows a partial perspective view of a portion of the uni-body integrated housing.

FIG. 11 shows a partial perspective view of a portion of the uni-body integrated housing 900 along section a-a, b-b and c-c. The uni-body integrated housing 900 includes a plurality of support and guide rib portions 910 and a plurality of support rib portion 912. The guide rib portions 910 extend substantially along an edge of the periphery of the housing 900. The support and guide rib portions 910 extend substantially along a portion of the edge which is located further away from the periphery of the housing than the guide rib portions 910. In certain embodiments, the support and guide rib portions 910 correspond to every other support rib portion 910 along each edge of housing.

In certain embodiments, the support and guide rib portions 910 are evenly spaced across each of the top edge 920, left edge 922 and right edge 924 of the housing 900. In certain embodiments, the support rib portions 912 are evenly spaced across each of the top edge 920, left edge 922 and right edge 924 of the housing 900. In certain embodiments, the support and guide rib portions 910 are positioned to correspond to every other support rib portion 912. In certain embodiments, there are four support and guide rib portions 910 along the left edge 922 and the right edge 924 as compared to seven support rib portions 910. In certain embodiments, there are five support and rib portions 910 along the top edge 920 as compared to twelve support rib portions 910. Accordingly, the rib support portions 910 provide additional support to the outside edges of the support panel 408 which in turn provides structural support to the optical sheets component 404 and the light guide plate 406

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A display device comprising:
an open cell liquid crystal display (LCD) component;
an optical sheets component;
a light guide plate;
a scalar board; and,
a uni-body rear cover, the uni-body rear cover affixing the optical sheets component to the display device, maintaining a gap between the open cell component and the optical sheets component, providing an exterior of the display device, protecting the open cell component from external forces and protecting the scalar board of the display device; and wherein
the uni-body rear cover comprises a plurality of support rib portions extending along inside edges of a plurality of edges of the uni-body rear cover along a periphery of the uni-body rear cover, each of the plurality of support rib portions comprising a support rib flat support portion, the support rib flat support portion providing support for the optical sheets component, the plurality of support rib portions being evenly spaced across each of a top edge, a left edge and a right edge of the uni-body rear cover;
the uni-body rear cover comprises a plurality of support and guide rib portions extending along inside edges of a plurality of edges of the uni-body rear cover along the periphery of the uni-body rear cover, the plurality of support and rib guide portions being located further away from the periphery of the uni-body rear cover than the support rib portions, each of the plurality of support and guide rib portions comprising a support and guide rib flat support portion, the support and guide flat support portion providing support for the optical sheets component, the plurality of support and guide rib portions being evenly spaced across each of the top edge, the left edge and the right edge of the uni-body rear cover; and wherein
the plurality of support and guide rib portions are positioned to correspond to every other of the plurality of support rib portions so that the plurality of support and guide rib portions correspond to alternating support rib portions.

2. The display device of claim 1, further comprising:
a support panel, the support panel comprising a plurality of guide holes, the plurality of guide holes mating with a respective plurality of guide projections of the plurality of support and guide rib portions, each of the plurality of guide projections of the plurality of support and guide rib projections extending from a respective support and guide rib flat support portion.

3. The display device of claim 1, wherein:
the uni-body rear cover defines an open cell support portion, the integrated open cell support portion providing structural support for the open cell LCD component.

4. The display device of claim 1, wherein:
the uni-body rear cover defines a plurality of grooves extending along an outside edge of the rear cover, the plurality of grooves preventing shrinkage of the rear cover.

5. A system comprising:
a processor;
a data bus coupled to the processor; and
a display device, the display device comprising
an open cell liquid crystal display (LCD) component;
an optical sheets component;
a light guide plate;
a scalar board; and,
a uni-body rear cover, the uni-body rear cover affixing the optical sheets component to the display device, maintaining a gap between the open cell component and the optical sheets component, providing an exterior of the display device, protecting the open cell component from external forces and protecting the scalar board of the display device; and wherein
the uni-body rear cover comprises a plurality of support rib portions extending along inside edges of a plurality of edges of the uni-body rear cover along a periphery of the uni-body rear cover, each of the plurality of support rib portions comprising a support rib flat support portion, the support rib flat support portion providing support for the optical sheets component, the plurality of support rib portions being evenly spaced across each of a top edge, a left edge and a right edge of the uni-body rear cover;
the uni-body rear cover comprises a plurality of support and guide rib portions extending along inside edges of a plurality of edges of the uni-body rear cover along the periphery of the uni-body rear cover, the plurality of support and rib guide portions being located further away from the periphery of the uni-body rear cover than the support rib portions, each of the plurality of support and guide rib portions comprising a support and guide rib flat support portion, the support and guide flat support portion providing support for the optical sheets component, the plurality of support and guide rib portions being evenly spaced across each of the top edge, the left edge and the right edge of the uni-body rear cover; and wherein
the plurality of support and guide rib portions are positioned to correspond to every other of the plurality of support rib portions so that the plurality of support and guide rib portions correspond to alternating support rib portions.

6. The system of claim 5, further comprising:
a support panel, the support panel comprising a plurality of guide holes, the plurality of guide holes mating with a respective plurality of guide projections of the plurality of support and guide rib portions, each of the plurality of guide projections of the plurality of support and guide rib projections extending from a respective support and guide rib flat support portion.

7. The system of claim 5, wherein:
the uni-body rear cover defines an open cell support portion, the integrated open cell support portion providing structural support for the open cell LCD component.

8. The system of claim 5, wherein:
the uni-body rear cover defines a plurality of grooves extending along an outside edge of the rear cover, the plurality of grooves preventing shrinkage of the rear cover.

9. The display device of claim 1, wherein:
two of the plurality of support and guide rib portions are positioned to correspond to a top most support rib portion and a bottom most support rib portion of the left edge of the uni-body rear cover; and, two of the plurality of support and guide rib portions are positioned to correspond to a top most support rib portion and a bottom most support rib portion of the right edge of the uni-body rear cover.

10. The system of claim 5, wherein:

two of the plurality of support and guide rib portions are positioned to correspond to a top most support rib portion and a bottom most support rib portion of the left edge of the uni-body rear cover; and two of the plurality of support and guide rib portions are positioned to correspond to a top most support rib portion and a bottom most support rib portion of the right edge of the uni-body rear cover.

* * * * *